Aug. 10, 1926. 1,595,339
H. A. BRITTAIN
PROTECTIVE DEVICE FOR PNEUMATIC TIRES
Filed March 2, 1921 3 Sheets-Sheet 2

Inventor
Harold A. Brittain
By R. D. Trogner
Attorney

O. E. Bee.

Patented Aug. 10, 1926.

1,595,339

UNITED STATES PATENT OFFICE.

HAROLD A. BRITTAIN, OF AKRON, OHIO, ASSIGNOR TO THE GOODYEAR TIRE & RUBBER COMPANY, OF AKRON, OHIO, A CORPORATION OF OHIO.

PROTECTIVE DEVICE FOR PNEUMATIC TIRES.

Application filed March 2, 1921. Serial No. 449,108.

My invention relates to protective devices for pneumatic tires, and it is particularly concerned with the provision of means for protecting the side walls against excessive wear.

It has been found in commercial practice, particularly, in that field wherein pneumatic tires are utilized on commercial vehicles, such as trucks, that roads are encountered of such nature as to produce excessive wear on the side walls of pneumatic tires. Such conditions obtain where non-surfaced roads must be travelled, which have ruts or deep grooves worn in them by continued travel, and when the walls of such ruts or grooves become hardened by reason of softened clay or mud being baked or frozen, the pneumatic tires are subjected to excessive wear. In fact there have been many practical occurrences wherein heavy pneumatic truck tires were worn completely through the side walls in a week's time, and it will be appreciated, therefore, that a device which portects the tires from such excessive wear is highly desirable, and, in fact, necessary in order to maintain the usefulness of the otherwise highly desirable pneumatic tires for commercial transportation.

One object of my invention, therefore, is to provide means for protecting the side walls of truck tires against excessive wear.

In view of the fact that it is frequently necessary to provide means for obtaining greater tractive effort between the tires and the roads or highways wherein such ruts are encountered as to excessively wear the side walls of the tire, I have also combined, with the protective means for the side walls, means for providing a greater tractive effort.

In certain regions of the country, the means for increasing the tractive effort of the tire is not essential, but the protective means for the side walls of the tire is necessary and I have, consequently, designed means for maintaining the protective means for the side walls securely in place, which does not alter the nature of the tire's road-engaging surface and consequently reduces the amount of wear upon the tread member, which must, necessarily, be utilized to connect the guards for the side walls.

With these and other objects in view, my invention will be more fully described, illustrated in the drawings, in which like numerals designate like parts, and then more fully pointed out in the claims.

Figure 1:
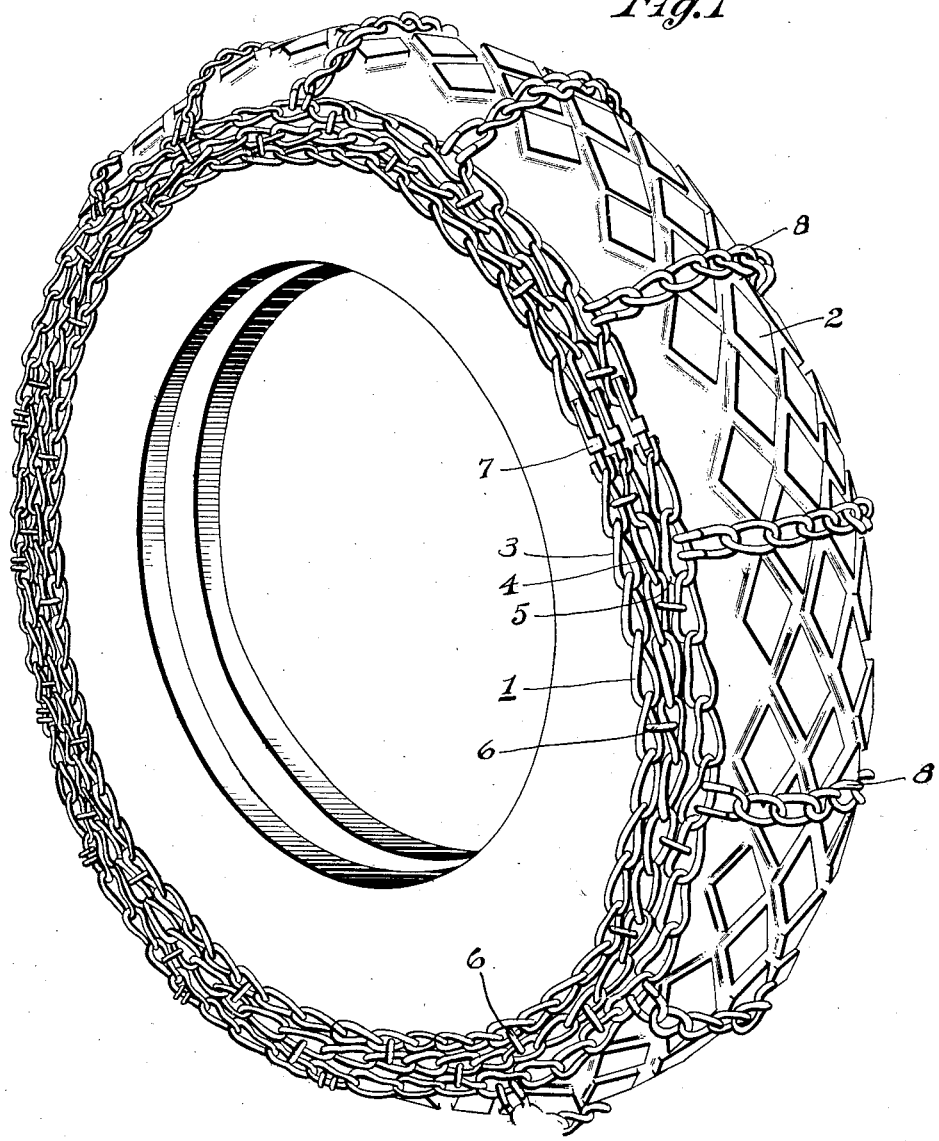
Fig. 1 is a perspective view of a pneumatic tire provided with a protective device constructed in accordance with my invention.

In practicing my invention, I may provide protective means for the side walls of a pneumatic tire by utilizing a plurality of chains which are suitably connected together to provide chain mats for each side wall of the tire, and by utilizing means to connect the guards and maintain them in position upon the tire. The guards for the side walls of the tire may be connected by cross-chains, such as are utilized in the ordinary type of non-skid chains, or I have also designed a cross-connecting-chain, or member, of such configuration as to seat in indentures of the non-skid tread of a tire, thus establishing ordinary running conditions for the tire tread.

It will be obvious, from the following description, that the broad idea of my invention may be embodied in a variety of slightly modified structural forms, but all of which come within the scope of my invention, and, furthermore, although I have elected to present the protective devices as applied to truck tires, it is entirely possible to utilize them in connection with the ordinary pneumatic tires for passenger vehicles. However, it will also be apparent that the wider field of application for my protective device will be found in commercial transportation, and, therefore, should be more widely employed upon pneumatic truck tires, In order to insure a clear and accurate understanding of my invention, reference may be had to the accompanying drawings, in Fig. 1 of which is shown one form of my protective device comprising a guard 1 for each side wall of the tire 2. The guard 1 is formed of a plurality of chains 3, 4 and 5 which are connected to form a chain mat by means of connecting links 6, disposed at properly spaced intervals throughout the length of the several chains. The ends of each of the chains are connected by suitable locking links 7, the particular construction of which is no part of my invention. The connecting member 7 may be one of any of the well known designs that are now utilized in non-skid chains, it only being necessary that they be sufficiently strong to maintain the ends of the chains in locked position. The guards for each side wall of the tire are similar in construction, and the description above presented may, therefore, be applied to both guards utilized for the protection of the side walls of the tire.

It is necessary, of course, to provide means to maintain the chain mats 1 in position upon the side walls, and to that end I utilize cross-chains 8, which are connected to the side wall guards at spaced intervals. The cross-chains 8, in addition to maintaining the side wall guards in position, afford a non-skid characteristic and increase the tractive effort of the tire.

The protective device, above described, is applied to the tire in the same manner as non-skid chains of ordinary design. The device as a whole is provided with open ends and may be draped over the tire. After the tire is then driven forward a slight distance, the locking members are brought into play to secure the device in position.

Figure 2:
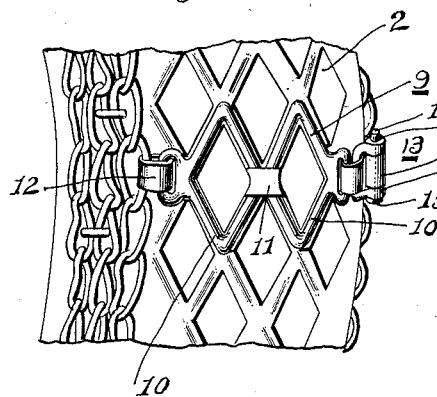
Fig. 2 is a fragmentary view, in elevation, of a modified means for connecting the guards for the side walls, which are also shown in Fig. 1.

Since it may be desirable, in some instances, to obviate the use of the non-skid cross-chains 8, shown in Fig. 1, I have designed a different connecting means, such as shown in Fig. 2. As here shown, a connecting member 9, comprising a plurality of links 10 formed of such configuration as to fit into indentures of the non-skid tread of the tire 2, is utilized. One of the connecting links 10 of the member 9 is provided with a centrally located hinge member 11, which encloses a portion of the other link 10 and thus provides a flexible joint at substantially the center of the tread of the tire. The hinged connection obviates flexing strains incident to the flexing of the tire under load.

Although the connecting member 9 may be secured to the side wall guards in various manners, I prefer to utilize a permanent connection 12 to one guard, and a removable connection 13 for the other guard. The connection 13 includes relatively movable members 13ª and 13ᵇ, the member 13ª being of U-shape and adapted to receive a cylindrical portion of the member 13ᵇ between its ends. A pin 14, having a head 15 and provided with an opening adjacent the end of its shank, is fitted into aligned openings in the ends of the member 13ª and the cylindrical body of the member 13ᵇ. A cotter pin 16, disposed in the opening in the pin 14, secures it in place and permits of its removal to disconnect the member 9 from one guard.

Figure 4:
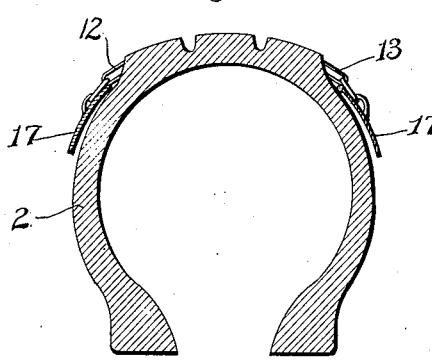
Fig. 4 is a transverse sectional view of the device and tire shown in Fig. 3.
Figure 3:
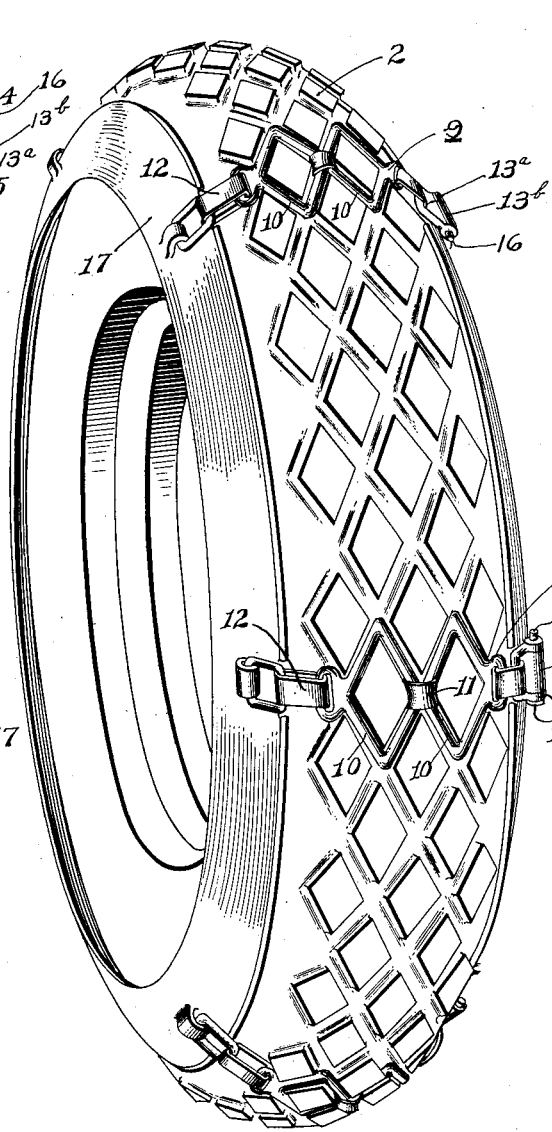
Fig. 3 is a perspective view of a modified form of protective means for a pneumatic tire, which embodies my invention.

In Fig. 3 is shown a modified form of my invention, in which a guard 17 for each side wall of the tire 2 is formed of an annular metal member stamped or pressed to conform to the contour of the side wall of the tire, and permit of a certain degree of movement between the tire and the guard under flexure of the tire. The guards 17 are connected by the member 9, shown in Fig. 2, but they may also be connected by means of a cross-chain, shown in Fig. 1, if desired. However, the connecting member 9 is more suitable to this type of tire guard, and is, therefore, shown as applied thereto. The guards shown in Figs. 3 and 4 afford the same degree of protection that the chain guard, above described, provides, but they do not possess the attractive advantage residing in the chain guard of being easily transported because of their collapsible character. The chain guards, it will be apparent, may be carried in a very small space when they are not in use, but the rigid annular members, shown in Figs. 3 and 4, must be carried in substantially the same form as they are applied to the tire.

Figure 5:
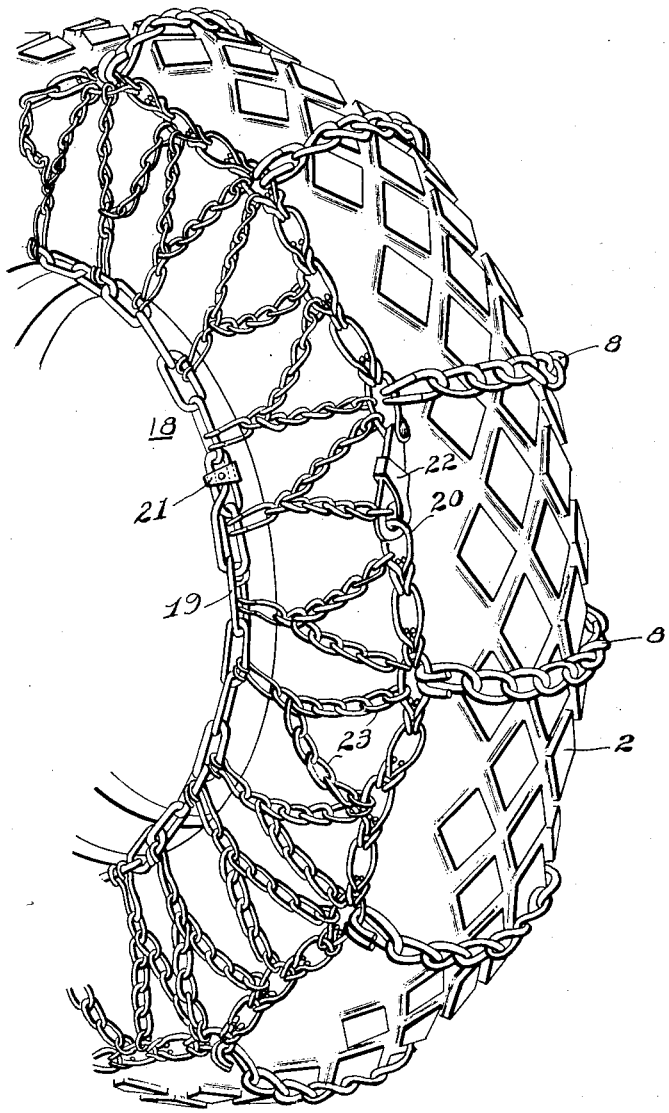
Fig. 5 is a perspective view, with parts broken away, of another form of protective device for a pneumatic tire, which embodies the principle of my invention.

In Fig. 5 is shown still another modification of my invention, which is closely related, however, to the form shown in Fig. 1. In this instance a guard 18 for each side wall of the tire is constructed by utilizing a plurality of chains 19 and 20, which are applied as chain rings to the tire by means of locking members indicated at 21 and 22. The chains 19 and 20 are connected at close intervals by chain members 23 of Y-shape, such shape being attained by utilizing a straight chain and connecting its two ends to one of the chains, as the chain 20, and then connecting its central link to the other chain 19. This form of side wall guard possesses certain inherent advantages among which is the relatively light weight of the cross-chains 23, which afford ample protection for the side walls of the tire. The side wall guards 18, here shown, are connected by the cross-chains 8, if desired, but the connecting member 9 may also be utilized with this form of side wall guard, as will be apparent.

Although I have shown and described protective devices for the side walls of pneumatic tires, it will be obvious that minor changes may be made in the construction thereof without departing from the spirit and scope of my invention, and I desire, therefore, that no limitations shall be imposed except such as are indicated in the appended claims.

What I claim is:

1. A tire shield comprising a plurality of rings formed of connected chain links, means for connecting the rings together to form a guard for each side wall of a tire, and a series of chains connected to the guards at spaced intervals about their circumference, said connected chains having links of such configuration as to fit into indentures in the tire tread.

2. A tire shield comprising a guard for each side wall of a tire and connecting means therefor including a plurality of members secured to the guards at intervals along their circumference, said means being adapted to fit into indentures in the tire tread and formed with hinged portions substantially intermediate their ends whereby strains attending the flexure of the tire are relieved.

In witness whereof, I have hereunto signed my name.

HAROLD A. BRITTAIN.